and subjoined 60# United States Patent Office 3,210,219
Patented Oct. 5, 1965

3,210,219
METHOD OF COATING WITH A PHOSPHORIC ACID ACTIVATED LACQUER COMPOSITION
Herbert Arthur Henry Jenkins, Hounslow, England, assignor to Hooker Chemical Corporation, Niagara Falls, N.Y., a corporation of New York
No Drawing. Filed June 8, 1962, Ser. No. 200,958
Claims priority, application Great Britain, June 8, 1961, 20,806/61
1 Claim. (Cl. 148—6.15)

The present invention broadly relates to an improved coating composition and more particularly to an improved activated lacquer composition for use as a coating on metal surfaces containing therein a controlled proportion of active phosphate ions providing therewith improved coating adhesion and corrosion resistance.

It is a primary object of the present invention to provide an improved coating composition or so-called "activated lacquer" which is surprisingly superior as a prime coating or decorative coating on metallic surfaces achieving excellent adhesion and corrosion resistance.

Another object of the present invention is to provide a novel activated lacquer composition containing a controlled quantity of active phosphate ions supported in a synthetic resin and solvent system so as to provide an equivalent phosphoric acid concentration at the metal surface ranging from about 100 to about 250 milligrams per square foot.

Still another object of the present invention is to provide an activated lacquer composition which can be simply and quickly applied to cleaned metal surfaces forming a tenaciously bonded film thereon which by virtue of the controlled active phosphoric acid content thereof also provides corrosion resistance substantially superior to that obtainable with coatings of similar type heretofore known.

A further object of the present invention is to provide an improved activated lacquer composition which is of simple and economical manufacture and use and which can be readily applied to clean metallic surfaces such as by spraying, dipping, brushing and the like.

The foregoing and other objects and advantages of the present invention are achieved by providing an activated lacquer composition which is particularly satisfactory for use as a prime coating on metal for a conventional painting sequence providing for exceptionally improved adhesion and corrosion resistance containing phosphoric acid or equivalent active phosphate ion liberating materials so as to yield a deposit ranging from about 100 to about 250 mg. per square foot calculated as phosphoric acid ($H_3PO_4$), which is retained by a suitable synthetic resin dissolved in an organic solvent. The invention is also directed to a novel method of providing a tenaciously bonded corrosion protective film on cleaned metallic surfaces employing activated lacquer compositions of the type herein described.

The activated lacquer composition comprising the present invention as herein described is expressed in terms of percentages by weight in the specification and subjoined claim unless otherwise specified.

The activated lacquer composition comprising the present invention comprises a suitable resin dissolved or dispersed in a solvent in which a controlled quantity of an active phosphate ion liberating compound is dissolved. The resin may comprise any suitable synthetic plastic which is soluble and otherwise compatible in the solvent system. Resins suitable for this purpose include polyvinyl acetal resins such as polyvinyl butyral for example, which is particularly satisfactory for forming tenaciously bonded corrosion resistant coatings in accordance with the practice of the present invention. The resin constituent in the lacquer may also include suitable modifying resins such as phenolic or epoxy resins, for example, which can be included in small amounts so as to modify the physical and chemical characteristics of the resultant dried coating consistent with the intended end use of the metallic article coated therewith.

The solvent employed for dissolving the resin and phosphate constituents may comprise any suitable organic volatile solvents or mixtures thereof which contain a sufficient proportion of polar groups in order to provide an adequate supply of active phosphate ions. Solvents which are eminently satisfactory for this purpose include alcohols such as isopropyl alcohol and ketones either alone or in admixture with other volatile organic solvents so that the resultant solvent mixture is of a sufficiently polar characteristic to enable ionization of the phosphate liberating constituent.

The active phosphate ion may be introduced in the lacquer formulation in the form of phosphoric acid itself or alternatively, acid alkyl phosphates or neutral phosphates together with acids such as tartaric acid, malonic, phthalic or gluconic acids, for example, can be satisfactorily employed.

The particular concentration of active phosphate in the lacquer composition will vary depending on the total resin content, the viscosity of the resultant lacquer composition, and the method by which the lacquer is applied to a surface to be coated. Conventionally, as the viscosity of the lacquer is increased the amount of active phosphate ion should be reduced since the deposited film will increase in thickness which correspondingly will effect an increase in the concentration of active phosphate ions which are able to migrate through the film during the drying thereof and deposit on the metallic surface being coated. Conversely, as the viscosity of the lacquer composition decreases, the concentration of the active phosphate ion should be increased to provide a concentration which will deposit between about 100 to about 250 mg. per sq. ft. of the active phosphate ion calculated as phosphoric acid ($H_3PO_4$) on the metallic surface. Similarly, for a given solvent system the use of a resin or a mixture of resins which are of a greater or lesser viscosity resulting in a corresponding change in the thickness of the film deposited will necessitate a corresponding adjustment of the active phosphate ion concentration so as to provide a deposit on the metallic surface within the aforesaid range. The resin content of the lacquer compositions in accordance with the practice of the present invention should not be less than one-half the phosphoric acid content, and conventionally the resin content exceeds the phosphoric acid content.

In order to achieve the benefits of the activated lacquer composition comprising the present invention, it is important that the active phosphate ion concentration deposited on the metal surface being coated be within a range of from about 100 to about 250 mg. per sq. ft. calculated as phosphoric acid. Concentrations below about 100 mg. per sq. ft. do not provide the necessary adhesion characteristics and corrosion protection whereas concentrations above about 250 mg. per sq. ft. do not provide any appreciable increase in corrosion resistance above that obtained with lacquer compositions forming deposits within the range hereinabove set forth. Since it is only the active phosphate constituents in the lacquer composition which provide the improved adhesion and corrosion resistance characteristics of the coating composition, it is important that this concentration be maintained so as to provide a deposit within the range of 100 to 250 mg. per sq. ft. The active phosphate content of the lacquer composition may be conveniently measured by titration with a standard alkali solution to a pH of about 4.5. When carrying out such a titration it is generally convenient to dilute the lacquer appreciably with isopropyl alcohol.

It is important to note that activated lacquer compositions incorporating active phosphate ion concentrations below that necessary for producing a coating of phosphate on the metal surface of about 100 mg. per sq. ft. calculated as phosphoric acid cannot be satisfactorily employed by using successive coats thereof to provide a deposit within the range herein specified. This is based on the fact that only the phosphate ions in the first coat can migrate to the metal surface and become deposited thereon whereas the resultant dried resin film acts as a barrier against such phosphate ion migration from second and succeeding coats.

Conventionally, suitable active lacquer compositions contain from about 2% to about 5% of phosphoric acid employing a total resin concentration of about 10% which yields a deposit of phosphates calculated as phosphoric acid in the range of about 100 to about 250 mg. per sq. ft. For example, an activated lacquer containing 9% by weight of total dissolved solids including 3% phosphoric acid provides a total solvent-free film weight of 600 mg. per sq. ft. of which 200 mg. per sq. ft. comprises phosphoric acid on the metal surface.

Excellent resistance to humidity and other corrosive influences is imparted to a metal surface by a film of lacquer having a thickness of the order of 0.0001 inch. However, it is sometimes desired to weld metallic components treated with a lacquer electrically, e.g. by spot-welding, and it has been found that difficulties can arise in the welding if the lacquer film is as much as 0.0001 inch thick. If the film thickness is reduced to about 0.00005 inch satisfactory welding can be ensured but the corrosion resistance imparted by the film is reduced.

It has been found that satisfactory welding can be achieved without sacrificing corrosion resistance by incorporating one or more conductive pigments in a lacquer according to the invention and forming a film 0.0001 to 0.0002 inch thick. No greater thickness than this is necessary to impart satisfactory corrosion resistance. The conductive pigment, examples of which include carbon black, graphite, lead, aluminum and mixtures thereof, appears to shorten electrically resistant paths through the lacquer film rather than render the film conductive by protruding through the film. To insure that the pigment is contained completely within the film it is important that its effective dimension is not greater than half the thickness of the film. By effective dimension is meant the thickness measured at right angles to the plane of the film, e.g., the flake thickness of a lamellar pigment such as graphite.

The amount of pigment required is relatively small, and is generally not sufficient to convert the material from a lacquer to what is normally considered to be a paint. The amount of pigment is generally less than 10% by weight of the resinous, film-forming content of the lacquers.

Because the lacquers have a very low viscosity when they are applied to a metal surface some difficulty may be experienced from settlement of the larger pigment particles; to overcome this the vessel containing the lacquer, whether a dipping tank or a tank supplying a spray-gun, may incorporate a stirrer to keep the pigment uniformly in suspension. In order to avoid difficulties of limited shelf-life, it is preferred that the pigments used should be completely inert towards phosphoric acid.

The activated lacquer formulation incorporating the appropriate quantities of the resin, solvent, pigment and phosphate constituents as hereinbefore set forth, can be applied to the cleaned surfaces of metal by any conventional means such as dipping, flooding, spraying, and the like, after which the coated surfaces can be air-dried or oven-dried to facilitate vaporization of the volatile solvent. In order to render the surfaces to be coated receptive to the activated lacquer composition, it is usually preferred to clean them by any one of the conventional techniques such as vapor degreasing; washing or spraying with a solvent; cleaning by application of an emulsifiable solvent followed by rinsing and drying; by spraying with emulsified solvent followed by rinsing and drying; by spraying with an alkali metal phosphate solution, with or without an accelerator, and containing a wetting agent followed thereafter by rinsing and drying, and the like. It generally is not preferred to employ an alkali cleaning method on the surfaces of the metal. After the lacquer composition has been applied to the metal surface and dried, subsequent coats of paint can be applied thereover by any one of the conventional painting techniques.

In order to further illustrate the composition of the activated lacquer comprising the present invention, the following examples are provided. It will be understood, however, that these examples are provided for the purposes of further illustration and are not intended to be limiting of the invention as set forth in the subjoined claim.

EXAMPLE I

A suitable activated lacquer composition was prepared having the following composition:

| Constituent: | Percent by weight |
| --- | --- |
| Polyvinyl butyral | 5 |
| Phenolic resin | 5 |
| N-butanol | 27 |
| Industrial methylated spirit | 30 |
| Methyl ethyl ketone | 30 |
| Phosphoric acid | 3 |

EXAMPLE II

A suitable activated lacquer composition was prepared having the following composition:

| Constituent: | Percent by weight |
| --- | --- |
| Polyvinyl butyral | 5 |
| Phenolic resin | 5 |
| N-butanol | 25 |
| Industrial methylated spirit | 30 |
| Methyl ethyl ketone | 30 |
| Phosphoric acid | 3 |
| Ethyl aniline phosphate | 2 |

EXAMPLE III

A suitable activated lacquer composition was prepared having the following composition:

| Constituent: | Percent by weight |
| --- | --- |
| Polyvinyl butyral | 5.5 |
| N-butanol | 40 |
| Solvent naphtha 90/160 | 50 |
| Triethylene glycol di-(2-ethyl butyrate) plasticizer—(sold under the trademark "Flexol 3GH") | 1.5 |
| Phosphoric acid | 3 |

EXAMPLE IV

A suitable activated lacquer composition was prepared having the following composition:

| Constituent: | Percent by weight |
| --- | --- |
| Polyvinyl butyral | 1 |
| Epoxy phenolic condensate (50% in toluene, ethyl glycol) | 18 |
| Toluene | 36 |
| Diacetone alcohol | 35 |
| N-butanol | 5 |
| Phosphoric acid | 5 |

Each of the foregoing activated lacquer compositions were applied to cleaned metal surfaces followed thereafter by drying and were found to provide excellent adhesion and corrosion protection of the substrate.

To illustrate the variation of the necessary active phosphate concentration as a function of the total resin content in the lacquer composition, a series of formulations were prepared in accordance with the composition as set forth in Example I in which the total resin content was varied providing for corresponding permissible ranges in the phosphoric acid content to provide a deposit of the phosphate ion calculated as phosphoric acid within the range of 100 to about 250 mg. per sq. ft. The results of these tests are set forth in the following table:

*Table I*

| Total Resin Content, Percent | Active Phosphate (as $H_3PO_4$) min.-max. (100 mg.)-(250 mg.) | Total Solids Content min.-max. | Total Solvent— Free Film Weight (mg./sq. ft.) min.-max. |
|---|---|---|---|
| | *Percent* | *Percent* | |
| 8 | 4–7 | 12–15 | 300–500 |
| 10 | 2.5–5 | 12.5–15 | 500–750 |
| 14 | 1.6–3 | 15.6–17 | 1,000–1,400 |

In accordance with the data set forth in the foregoing table, it will be apparent that for a given solvent system, as the amount of resin is increased, a corresponding decrease in the concentration of phosphoric acid is required so as to provide the necessary deposit of phosphate on the metal surface. In the particular example employed, the polyvinyl butyral resin used was one of medium viscosity (a viscosity of a 5% solution in ethanol at 25° C. ranged between about 20 and 30 centipoises). Similar considerations with respect to other suitable resins or mixtures thereof as well as changes in the solvent system are required in order to provide a deposit within the range as hereinabove set forth.

While it will be apparent that the preferred embodiments of the invention disclosed are well calculated to fulfill the objects above stated, it will be appreciated that the invention is susceptible to modification, variation and change without departing from the proper scope or fair meaning of the subjoined claim.

What is claimed is:

A method of rendering a surface corrosion resistant and receptive to the application of decorative coatings thereon which consists essentially of the steps of providing a metal surface to be coated, cleaning the surface to remove undesirable deposits therefrom, applying to those portions of the surface to be protected a single coating of an activated lacquer composition which consists essentially of from about 8% to about 14% by weight of the composition of a soluble, dispersible resin consisting of polyvinyl butyral and a modifying resin selected from the group consisting of phenolic, epoxy, phenolic-epoxy condensates and mixtures thereof, said modifying resin being present in an amount up to 90% by weight of the total resin present, an organic solvent of which a portion thereof is of a polar type, phosphoric acid in an amount of from 1.6% to 7% by weight of the lacquer composition, the amount of phosphoric acid present being increased as the amount of total resin is decreased, within the ranges set forth, such that the total resin and phosphoric acid are present in the lacquer composition in relative amounts sufficient to provide phosphate ions, calculated as $H_3PO_4$, in an amount within the range of 100 to 250 milligrams per square foot on the metallic surface coated with the composition, and a finely particulated electrically conductive pigment present in an amount up to about 10% by weight of the resin, and having an effective dimension within the range of about 0.0005 to about 0.0001 inch, but in no case greater than one-half the thickness of the film obtained when the lacquer composition is applied to the metal surface, applying said composition to the surface to be protected in an amount sufficient to provide a dried film having a thickness within the range of about 0.0001 to 0.0002 inch, and thereafter, drying the coating to remove substantially all of the solvent therefrom.

References Cited by the Examiner

UNITED STATES PATENTS 2,709,664 5/55 Evans _____ 117—75
2,839,438 6/58 Rosenbloom _____ 148—6.15

FOREIGN PATENTS 791,638 3/58 Great Britain.

OTHER REFERENCES

Gotfried: Finish, February 1954, pp. 29–31, 82.
Burns and Bradley: Protective Coatings for Metals, Reinhold Publishing Corp., 1955, pp. 414–416, TA462 B85.

RICHARD D. NEVIUS, *Primary Examiner.*